United States Patent
Lee et al.

(10) Patent No.: US 11,135,719 B2
(45) Date of Patent: Oct. 5, 2021

(54) REAL-TIME CONTROL SYSTEM, REAL-TIME CONTROL DEVICE AND SYSTEM CONTROL METHOD

(71) Applicant: RAINBOW ROBOTICS, Daejeon (KR)

(72) Inventors: Jung Ho Lee, Daejeon (KR); Jeong Soo Lim, Daejeon (KR)

(73) Assignee: RAINBOW ROBOTICS, Daejeon (KR)

( * ) Notice: Subject to any disclaimer, the term of this patent is extended or adjusted under 35 U.S.C. 154(b) by 485 days.

(21) Appl. No.: 15/762,060

(22) PCT Filed: Jul. 22, 2016

(86) PCT No.: PCT/KR2016/008031
§ 371 (c)(1),
(2) Date: Mar. 21, 2018

(87) PCT Pub. No.: WO2017/052059
PCT Pub. Date: Mar. 30, 2017

(65) Prior Publication Data
US 2018/0281195 A1   Oct. 4, 2018

Related U.S. Application Data

(60) Provisional application No. 62/221,215, filed on Sep. 21, 2015.

(30) Foreign Application Priority Data

Jan. 19, 2016 (KR) .................. 10-2016-0006426
Feb. 22, 2016 (KR) .................. 10-2016-0020775

(51) Int. Cl.
*B25J 9/16* (2006.01)
*G06F 9/54* (2006.01)
(Continued)

(52) U.S. Cl.
CPC .......... *B25J 9/1656* (2013.01); *B25J 9/0084* (2013.01); *B25J 9/161* (2013.01); *B25J 9/1602* (2013.01);
(Continued)

(58) Field of Classification Search
USPC .................................................. 700/245–264
See application file for complete search history.

(56) References Cited

U.S. PATENT DOCUMENTS 5,038,089 A * 8/1991 Szakaly ............... G05B 19/427
  701/23
5,047,700 A * 9/1991 Szakaly ............... G05B 19/427
  318/568.1

(Continued)

FOREIGN PATENT DOCUMENTS

CN    1577278 A    2/2005
EP    2575002 A1   4/2013
(Continued)

OTHER PUBLICATIONS

J. A. Janet, W. J. Wiseman, R. D. Michelli, A. L. Walker and S. M. Scoggins, "Using control networks for distributed robotic systems," Proceedings 1999 IEEE International Conference on Robotics and Automation (Cat. No.99CH36288C), 1999, pp. 1138-1143 vol. 2, doi: 10.1109/ROBOT.1999.772515. (Year: 1999).*

(Continued)

*Primary Examiner* — Jonathan L Sample
(74) *Attorney, Agent, or Firm* — Novick, Kim & Lee, PLLC; Sang Ho Lee

(57) ABSTRACT

A system controlling method according to an embodiment of the present invention comprises operating a plurality of agents having mutually independent processes using a shared memory; obtaining hardware control data for controlling one or more devices from each of references gen- (Continued)

erated from the plurality of agents and stored in the shared memory; and transferring control signals according to the references to the one or more devices selected from the hardware control data.

10 Claims, 13 Drawing Sheets

(51) Int. Cl.
*B25J 9/00* (2006.01)
*B25J 19/02* (2006.01)
*G05B 19/042* (2006.01)

(52) U.S. Cl.
CPC .......... *B25J 9/1661* (2013.01); *B25J 9/1664* (2013.01); *B25J 9/1694* (2013.01); *B25J 19/02* (2013.01); *G05B 19/042* (2013.01); *G06F 9/544* (2013.01); *G06F 9/545* (2013.01); *Y10S 901/08* (2013.01); *Y10S 901/46* (2013.01)

(56) References Cited

U.S. PATENT DOCUMENTS

| | | | | |
|---|---|---|---|---|
| 6,418,478 | B1* | 7/2002 | Ignatius | G06F 3/0613 709/201 |
| 10,423,558 | B1* | 9/2019 | Fukami | G06F 3/067 |
| 2003/0050734 | A1* | 3/2003 | Lapham | B25J 9/1697 700/245 |
| 2005/0055132 | A1* | 3/2005 | Matsumoto | B25J 9/1682 700/245 |
| 2006/0111810 | A1 | 5/2006 | Kim et al. | |
| 2006/0155387 | A1* | 7/2006 | Pieronek | G05B 19/056 700/1 |
| 2007/0168082 | A1* | 7/2007 | Kim | G06F 9/3851 700/245 |
| 2008/0027580 | A1 | 1/2008 | Zhang et al. | |
| 2010/0274385 | A1* | 10/2010 | Eriksson | G05B 19/4141 700/245 |
| 2012/0074876 | A1* | 3/2012 | Redler | H02P 5/52 318/41 |
| 2013/0345884 | A1* | 12/2013 | Forbes, Jr. | G05B 19/042 700/286 |
| 2016/0019105 | A1* | 1/2016 | Mikami | G06F 9/545 719/313 |
| 2018/0290657 | A1* | 10/2018 | Ryne | G06K 9/00818 |
| 2019/0135281 | A1* | 5/2019 | Miura | G05D 1/0088 |
| 2019/0329782 | A1* | 10/2019 | Shalev-Shwartz | G08G 1/0145 |
| 2020/0079377 | A1* | 3/2020 | Yashiro | B60W 10/04 |
| 2020/0097008 | A1* | 3/2020 | Sadat | B60W 50/0097 |

FOREIGN PATENT DOCUMENTS

| | | |
|---|---|---|
| JP | 61-117605 A | 6/1986 |
| JP | 63-289607 A | 11/1988 |
| JP | 05-038689 A | 2/1993 |
| JP | 10-309685 A | 11/1998 |
| JP | 2001-331222 B2 | 11/2001 |
| JP | 2002-187082 A | 7/2002 |
| JP | 2003-114707 A | 4/2003 |
| JP | 2006-255797 A | 9/2006 |
| JP | 2007-011978 A | 1/2007 |
| JP | 2012-125849 B2 | 7/2012 |
| JP | 2013-010165 A | 1/2013 |
| KR | 10-2003-0081370 A | 10/2003 |
| KR | 10-0520779 B1 | 10/2005 |
| KR | 10-2007-0083460 A | 8/2007 |
| KR | 10-2012-0015045 A | 2/2012 |
| KR | 10-2013-0110289 A | 10/2013 |

OTHER PUBLICATIONS

J. A. Janet, W. J. Wiseman, R. D. Michelli, A. L. Walker, M. D. Wysochanski and R. Hamlin, "Applications of control networks in distributed robotic systems," SMC'98 Conference Proceedings. 1998 IEEE International Conference (Cat. No.98CH36218), 1998, pp. 3365-3370 vol. 4 (Year: 1998).*

Nikolaus Vahrenkamp et al.; "The robot software framework ArmarX", IT—information technology., vol. 57, No. 2, Jan. 28, 2015.

* cited by examiner

REAL-TIME CONTROL SYSTEM, REAL-TIME CONTROL DEVICE AND SYSTEM CONTROL METHOD

TECHNICAL FIELD

The present invention relates to a real-time control system, system controlling apparatus and system controlling method, and more specifically to a real-time control system, system controlling apparatus and system which can perform exact real-time process, facilitate easy debugging, and strong in hardware.

BACKGROUND ART

Researches on robot are vividly implemented in a number of authorities domestic and abroad currently. A robot can be divided largely into hardware and software, which may be integrated to realize one system.

Elements constructing robot hardware may include driver and controller for moving robot joint, battery and power source controller, communication module, sensors, exoskeleton of robot, electronic circuit, battery and so on. A robot hardware platform may be formed by combining elements of these various sorts as wanted properties of each of robots.

And each of elements are further different each other in size, appearance, performance, manufacturer and the like according to design object, by which robot hardware platforms of infinite sorts may be produced as a result. Actually, a vast variety of robots exist all over the world. Therefore, researches surveying performance and functions of robot platforms having common object to develop one representative standard type robot platform are under progressing all over the world.

And, like there are researches in a direction of developing a standard type robot platform in hardware field as described above, there are researches on standard type robot software usable in common in software field. There exist a variety of kinds of software such as software for controlling robot devices such as drive controller or sensors belonging into robot hardware, software for helping easy development of robot motion, software determining relationship among tasks to help operation of robot, software providing navigation or vision solution and the like, and the development of standard type software is under progressing under a similar object to that of the development of standard type hardware.

However, in the development of the standard type software, providing a standard solution for settling common requirements of plenty of developers is actually difficult.

Especially, not only co-work between developers may get harder as changed matters in hardware gets more, but also problems that processes overlap by functions or processes simultaneously developed by a plurality of persons may generated. Accordingly, there may be problems that real-time synchronization is difficult, hardware stability or toughness is decreased, and development time becomes longer.

And, there may be problems that driving performance is decreased since additional function change should be added to maintain compatibility with the standard software in hardware development.

DISCLOSURE

Technical Problem

The present invention is to solve the problem as described above, an object of which is to provide a real-time system, a system controlling apparatus and a system controlling method that a plurality of independent processes with respect to the same hardware control and process can coexist, operation of robot according to the same can be controlled stably, and the toughness and expandability thereof can be provided in a system needing real-time features.

Technical Solution

A method according to an embodiment of the present invention to settle the problem as described above is a system controlling method comprising operating a plurality of agents having mutually independent processes using a shared memory; obtaining hardware control data for controlling one or more devices from each of references generated from the plurality of agents and stored in the shared memory; and transferring control signals according to the references to the one or more devices selected from the hardware control data.

And, an apparatus according to an embodiment of the present invention to solve the problem as described above is a system controlling apparatus comprising a plurality of agents having independent processes; a shared memory where references generated according to operation of the plurality of agents being stored; and a device control module obtaining hardware control data for controlling one or more devices from each of the references generated from the plurality of agents and stored in the shared memory and transferring control signals according to the references to the one or more devices selected from the hardware control data.

And, a real-time system to settle the problem as described above comprises one or more hardware devices comprising a joint or a sensor device of the system; a plurality of agents having mutually independent processes related to the system; a shared memory where references generated according to operation of the plurality of agents being stored; a device control module obtaining hardware control data for controlling the one or more devices from each of references generated from the plurality of agents and stored in the shared memory and transferring control signals according to the references to the one or more devices selected from the hardware control data; and a user system managing real-time operation period and execution operation of the device control module and the agents.

A method according to an embodiment of the present invention to settle the problem as described above is a real-time device system controlling method comprising obtaining status information of current step from control target devices; transferring the status information to one or more agents processing reference operations using the status information of current step; obtaining reference information pre-operated based on status information of previous step from the agents; and transferring the reference information to the devices as control signals corresponding to current step.

And, an apparatus according to an embodiment of the present invention to solve the problem as described above is a device system controlling apparatus comprising a device communication unit obtaining status information of current step from control target devices and transferring the status information to one or more agents processing reference operations using the status information of current step; and a reference obtaining unit obtaining reference information pre-operated based on the status information of previous step from the agents, wherein the device communication unit transferring the reference information to the devices as control signals corresponding to current step.

And a system to settle the problem as described above is a device controlling system comprising a plurality of agents having mutually independent processes; a shared memory where references generated according to operation of the plurality of agents being stored; and the device control module obtaining status information of current step from the control target devices; transferring the status information to the plurality of agents processing reference operations using the status information of current step; obtaining reference information pre-operated based on status information of previous step from the agents; and transferring the reference information to the device as a control signal corresponding to current step.

On the other hand, a method to solve the problem as described above can be realized as a program for executing the method on a computer and a recording medium recording the program.

Advantageous Effects

According to an embodiment of the present invention, by providing a plurality of agents having mutually independent processes and a shared memory where references generated according to operation of the plurality of agents stored and by providing a separate device control module controlling the hardware devices using the references, a plurality of independent processes can coexist with respect to the same hardware control in a robot system needing real-time features, by which operation of robot can be controlled with stability.

According to an embodiment of the present invention, even though each of agents may be developed independently, synthesis and selection of reference may be enabled through the shared memory, by which possibility of mutual collision can be reduced and strong real-time features can be secured. And, agent substitution, real-time debugging and the like at the time of error occurrence can be facilitated, by which co-work convenience and expandability can be drawn.

And, according to an embodiment of the present invention, process delay between device control module, agent and device may be minimized and accordingly real-time synchronization process may be optimized by providing one step delay process method using a shared memory in thread synchronization between processes, by which a control system with which quality of output signal and real-time features are reinforced and error and jitter are more elaborately minimized can be provided.

BEST MODE

Figure 1:
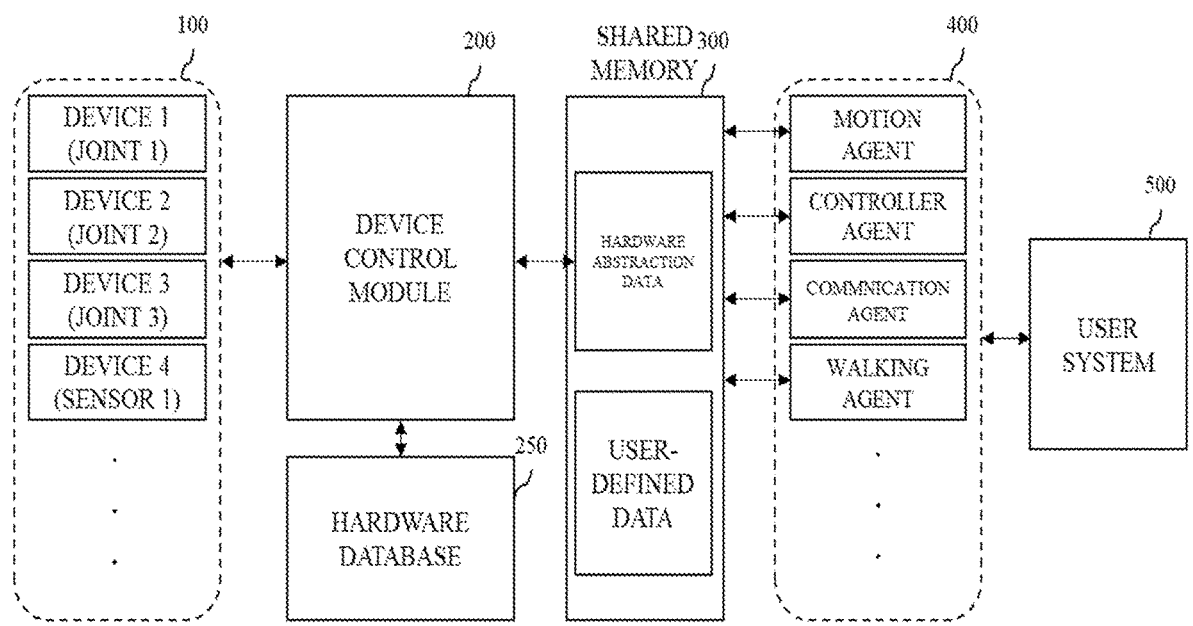
FIG. 1 is a conceptual diagram showing schematically the whole system according to an embodiment of the present invention.

Hereinafter, the only principle of the present invention will be illustrated. Therefore, a person in the art may be able to invent a variety of apparatus included in the concept and range of the present invention by realizing the principle of the present invention even though clarity may not be described or shown in the specification. And, all the conditional terms and embodiments listed in the specification are in principle intended clearly only for the purpose of appreciation of concept of the present invention, which should be understood not to be restrictive to such an especially listed embodiments and status.

And, all the detailed description listing specific embodiments as well as principle, viewpoint, and embodiments of the present invention should be understood as to be intended to include structural and functional equivalents of these matters. And, these equivalents should be appreciated to include equivalents developed in the future, that is all the elements invented to perform the same function regardless of structure, as well as equivalents known public currently.

Accordingly, for example, block diagrams of the present specification should be appreciated as to show conceptual viewpoint of indicative circuit realizing the principle of the present invention. Similarly, all the flow chart, status conversion diagram, pseudo code and the like may be shown actually in a computer-readable medium and should be understood to show a variety of processes performed by computer or processor regardless of whether the computer or processor is depicted clearly or not.

Functions of a variety of elements shown in drawings including function blocks expressed as processor or a similar concept thereto may be provided not only by exclusive hardware but also by usage of hardware in relation to a proper software having ability to execute software. When provided by a processor, the function may be provided by a single exclusive processor, a single shared processor or a plurality of individual processors, among which a unit may be shared.

And, clear usage of terms suggested as a processor, a control or a concept similar thereto should not be interpreted with exclusive citation of hardware having ability to execute software but should be appreciated to suggestively include digital signal processor (DSP) hardware, ROM, RAM and non-volatile memory to store software without limitation. And another well-known or commonly used hardware may be included.

The constructing elements in claims of the present specification expressed as means for performing functions written in the detailed description are intended to include all the method performing functions including software of all the type including, for example, combination of circuit elements perform the functions, firmware/microcode or the like, which may be coupled to a proper circuit to execute the software to perform the function. In the present invention defined by such a claim, the functions provided by the means listed in variety may be coupled each other and may be coupled in a way required from the claim, by which any means capable of providing the function should be understood as equivalent to that comprehended from the present specification.

The objects, features and merits described above may become clearer through following detailed description related to attached drawings, according to which a person having an ordinary knowledge in the technical field where the present invention pertains may be able to implement the technical idea of the present invention with ease. And, in case that detailed explanation on a publicly known technology related to the present invention may be determined to blur the gist of the present invention unnecessarily in the description of the present invention, the detailed description may be omitted.

Hereinafter, a desirable embodiment according to the present invention will be described in detail in reference to attached drawings.

FIG. 1 is a conceptual diagram showing schematically the whole system according to an embodiment of the present invention.

Referring to FIG. 1, the whole system according to an embodiment of the present invention may include one or more devices 100, a device control module 200, a shared memory 300, one or more agents 400 and a user system 500.

The devices 100 may include one or more drive apparatus finally performing operation of the robot system. The drive apparatus may include hardware apparatus or software apparatus. The drive apparatus may include at least one of, for example, a joint device controlling drive with respect to a joint motor, a sensor device including a sensor board, or simulator apparatus.

And, the devices 100 may be controlled according to control signals received from the device control module 200 and may output a variety of data such as sensor data to the device control module 200. And, the term of devices 100 herein is not limited to hardware but can be used as concept including software driver for driving actual hardware device. Therefore, each of the devices 100 may be connected to the device control module 200 physically and in software.

And, each of devices 100 may form a communication network with the device control module 200. The communication network may form a system network using a protocol of CAN (Controller Area Network) method for system stability.

For example, each of device 100 may be connected to the device control module 200 in one or more CAN communication channels and may receive a message constructed with CAN frame data or may output a message to the device control module 200 according to control period pre-set through the CAN communication channel. Here, the message may include motor control reference, encoder value, controller status value, PWM (Pulse Width Modulation) command, sensor value or a variety of other settings or output values.

And, the device control module 200 may obtain hardware control data for control of the one or more devices 100 from each of references generated from the plurality of agents 400 and stored into the shared memory and may transfer control signals according to the references to the one or more devices 100 selected from the hardware control data.

The device control module 200 may reside always on an operating system for control of the robot system to be executed in background.

The device control module 200 may communicate directly to the devices 100 solely in reference with the shared memory 300 and may transfer control signals or may receive sensor signals through the communication channel.

For example, the device control module 200 may transfer a reference for control of the joint device 100 or may receive sensor information needed from the sensor device 100.

And, the device control module 200 may include a real-time thread generated on the operating system. And, the thread may enable real-time processes by synchronization to a motion generating operation period of the system. And, the device control module 200 may further include a non-real-time thread for processes of data reading, convert and the like.

And, the plurality of agents 400 may be realized by independent software modules having mutually independent processes. For example, the agents 400 may process different motions to each other, and may perform processes for outputting references corresponding to the same. For example, each of the agents 400 may include a motion agent, a controller agent, a communication agent or a walking agent, a damping agent, and other variety of agents.

Since the processes are separated functionally in the agents 400 as described above, heap, data and static memory are not shared for each of thread to be generated to operate, and each of needed data for mutual share may be provided to the shared memory 300, by which an organic process without mutual collision may be enabled and software development and process may be enabled with ease.

Especially, according to an embodiment of the present invention, the plurality of agents 400 may refer to sensor data from the shared memory 300 according to operation of mutual independent processes, and according to an embodiment of the present invention, each of the agents 400 may refer to hardware abstraction data and user-defined data of the shared memory 300 according to each of defined processes, and may store reference data generated based on the same to hardware abstraction data of the shared memory 300.

Here, the user-defined data may include a shared data for information share between the agents 400 and a variety of data for other system drive which user-definition allowed.

And, the hardware abstraction data may include references, sensor data, motion owner variable and command data abstracted for control of the devices 100. And, the device control module 200 may generate control signals by each of devices 100 using the hardware abstraction data and hardware information stored in a hardware database 250 in advance.

Accordingly, the device control module 200 may identify the control target devices 100, may generate control signals with respect to the control target devices 100, and may output control signals according to the references to the control target devices 100 using the hardware abstraction data extracted from the shared memory 300.

And, for guarantee of strong real-time features, there is a need that process period of each of agents 400 is shorter than operation period processing motion information of the system. Accordingly, the time at which the agents 400 may generate references from sensor data, the device control module 200 may generate and output control signals from the references through shared memory 300, and sensor data is updated may be included within a first operation period of the system. Therefore, the series of operations may be all processed within the first operation period.

On the other hand, the user system 500 may provide a user interface for controlling and monitoring the agents 400 and the device control module 200. And, the user system 500 may include middleware for control of the agents 400 and may provide a variety of interfaces which can be connected to other external system.

Figure 2:
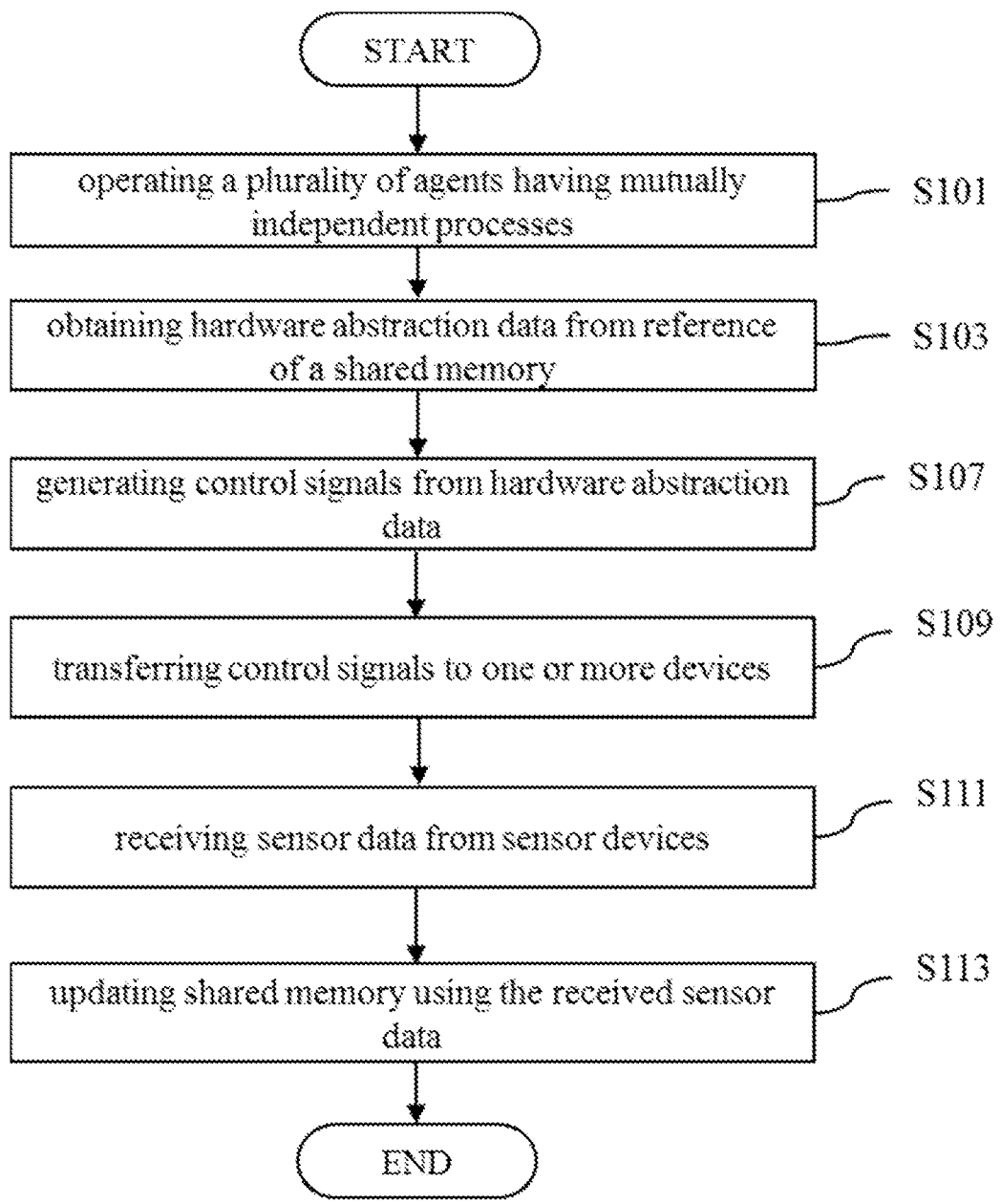
FIG. 2 is a flow chart for explaining control method of robot system according to an embodiment of the present invention.

FIG. 2 is a flow chart for explaining control method of robot system according to an embodiment of the present invention.

Figure 3:
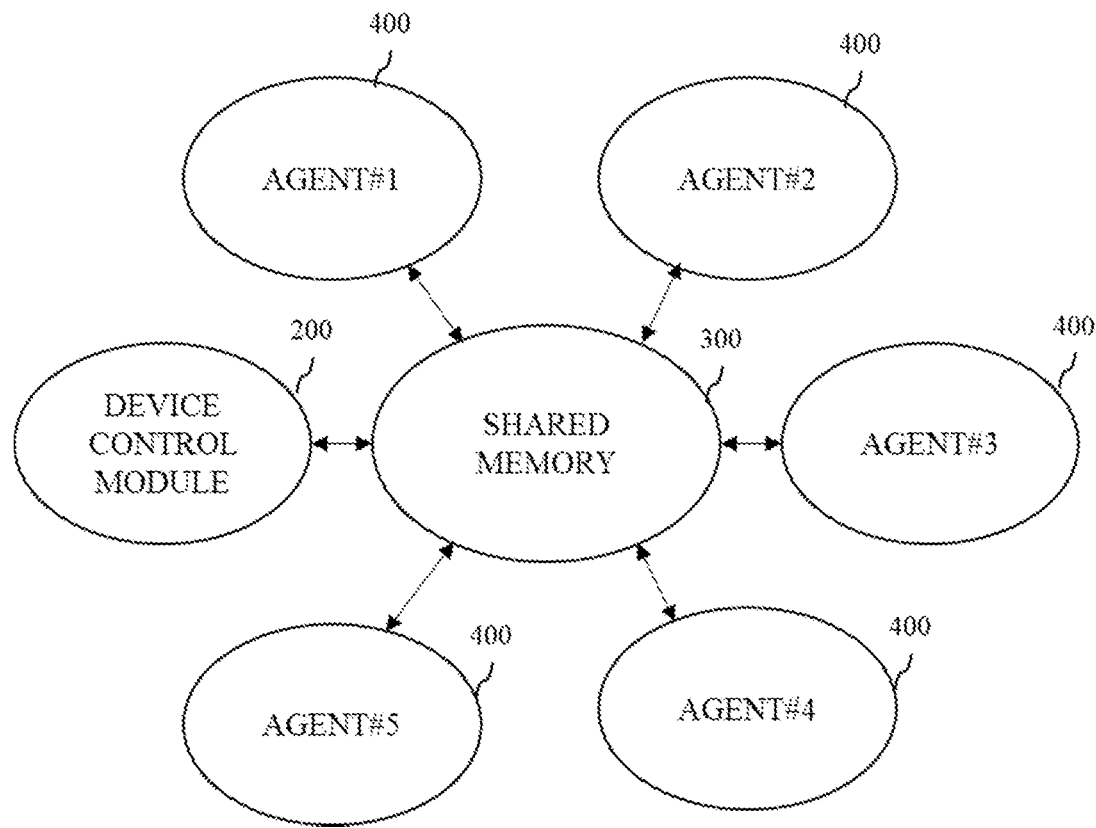
FIG. 3 and FIG. 4 are diagrams for explaining relationship between the shared memory and the system according to an embodiment of the present invention.
Figure 4:
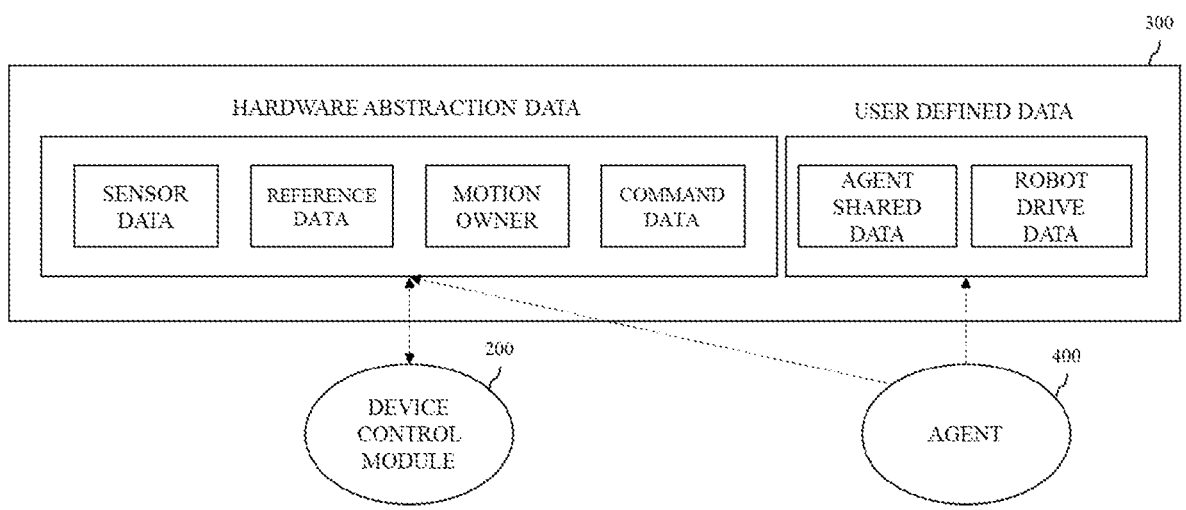

And, FIG. 3 and FIG. 4 are drawings for explaining relationship between the shared memory and the system according to an embodiment of the present invention.

Figure 5:
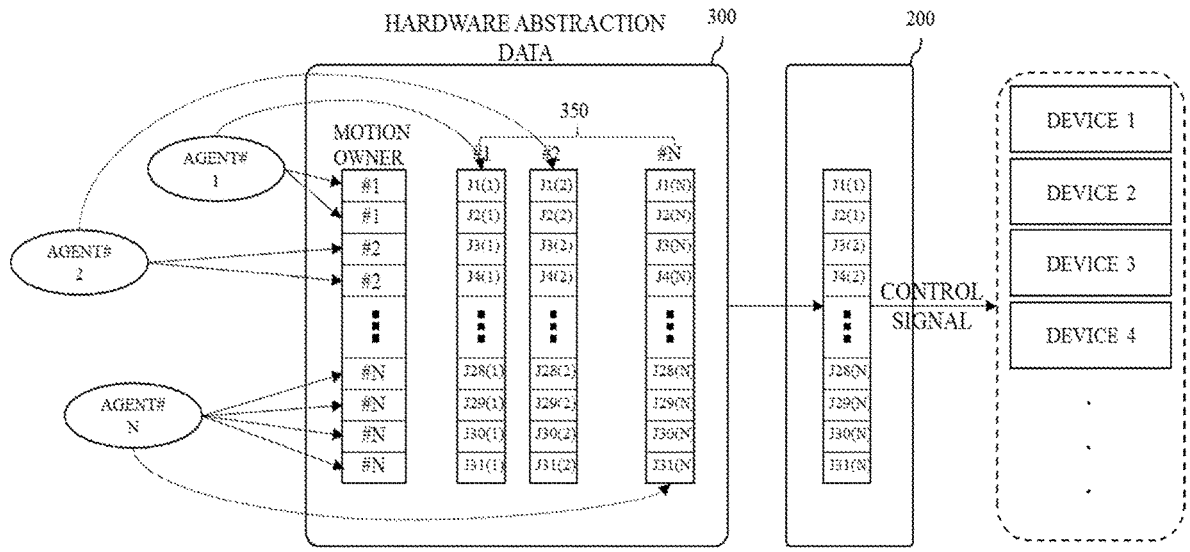
FIG. 5 is a diagram for explaining data exchange between the device control module and the agents according to an embodiment of the present invention.

And, FIG. 5 is a drawing for explaining data exchange between the device control module and the agents according to an embodiment of the present invention.

Hereinafter, a robot system and a control method thereof of the present invention will be described in more detail in reference to FIG. 2 to FIG. 5.

Referring to FIG. 2, in a control method of a robot system according to an embodiment of the present invention, firstly operation of a plurality of agents 400 having mutually independent processes may be performed (S101).

And, the device control module 200 may obtain hardware abstraction data from references stored in the shared memory 300 (S103).

And, the device control module 200 may generate control signals for hardware control from the hardware abstraction data (S107) and may transfer the generated control signals to one or more devices 100 (S109).

On the other hand, the device control module 200 may receive sensor data from the devices 100 corresponding to the sensor (S111) and may update the received sensor data into the shared memory 300 (S113).

And, the series of operation steps can be all processed within the first period corresponding to the real-time operation period of the robot system, by which the real-time features can be guaranteed.

For the processes as described above, as shown in FIG. 3, each of the agents 400 and the device control module 200 may perform data exchange and transfer process using the shared memory 300.

The references corresponding to each of devices 100 may be stored in the shared memory 300 according to operation of each of agents 400, and the device control module 200 may obtain the references and may use it in outputting the control signals.

Such a plurality of agents 400 and the device control module 200 may construct a multi-agent system with the shared memory 300 as the center. Accordingly, each of parts performing independent work may be developed separately by several developers or may be co-worded, by which an advantageous structure at a robot system develop environment may be obtained.

By using the agents 400 according to an embodiment of the present invention, the developers may be guaranteed with independent development space from a process concurrent development model, while mutual action on an operation result matter of other agents 400 or data giving and receiving may be enabled using the shared memory 300.

On the other hand, as shown in FIG. 4, the hardware abstraction data and the user-defined data may be included on the shared memory 300.

The hardware abstraction data may include sensor data, reference data, motion owner and command data, and the device control module 200 can access only to the hardware abstraction data area of the shared memory 300.

Accordingly, the device control module 200 may access to the hardware abstraction data area of the shared memory 300 to update sensor data received from the devices 100 or to obtain the updated reference data, to generate the control signals for the devices 100.

Here, the hardware abstraction data may have a data format converted with abstraction of detailed data on the robot device control, while the device control module 200 may convert this to an actual hardware control signals to be transferred to the proper devices 100.

Accordingly, a developer or a user of the agents 400 can control with ease without deep understanding on the hardware. The developer or the user may transfer an abstracted hardware input information to the references through the shared memory 300, while the device control module 200 may generate low level control signals for control of the devices 100 from the hardware abstraction data.

And, there may be an expandability of hardware and change and correction of hardware, for which the device control module 200 may manage hardware information needed in generating the control signals using above-mentioned hardware database 250. The hardware information may include, for example, a list of the devices 100, joint motor information (reduction gear ratio, encoder pulse, number of driver channels or the like), communication protocol or the like.

The device control module 200 may grasp hardware information of the drive target devices 100 by loading the hardware database 250, accordingly, may generate control signals optimal for control of the drive target devices 100. And, even when change of hardware occurs or hardware of new construction is used, adaptation can be enabled with only correction of the hardware database 250, by which a property strong to hardware change, and expandable in hardware can be provided.

And, the hardware abstraction data may include reference data, sensor data, motion owner and command data.

Here, the references data may be updated according to an operation result at each of agents 400 and may include an object value in current step so that the device control module 200 control the each of devices 100. For example, the reference data may include joint motion references and joint controller references And, the sensor data may include measurement data that the device control module 200 may receive from each of devices 100. Here, the measurement data may include, for example, status information at current step including encoder value and sensing data of the joint device.

On the other hand, the command data may include command information for control the device control module 200 and the agents 400 at upper system level and may include command target process information and parameter information.

On the other hand, there is no room for confusion in other data of the shared memory 300 since they are values read by the agents 400, while, in the case of reference data, values on the same joint device 100 outputted by each of agents 400 may differ. To eliminate the room of collision according to the above, the shared memory 300 may include motion owner information.

And, as shown in FIG. 5, the relationship between the motion owner and the reference data may be described in data exchange between the device control module 200 and the agents 400 according to an embodiment of the present invention.

As shown in FIG. 5, a memory area 350 by the agents 400 may be included at the hardware abstraction data area of the shared memory 300 where the reference data can be updated by each of agents 400.

Accordingly, each of agents 400 may update references calculated by oneself into a memory space area of oneself.

Here, each of agents 400 may operate and update reference data corresponding to each of devices 100. For example, in case that the joint devices 100 exist total 31 units as J1~J31, reference data area corresponding to the each of joint device 100 may be included at memory space area by each of agents 400.

At the same time, the shared memory 300 may include a motion owner variable for each of the joint devices 100. Therefore, motion owner variables of the same number as that of the joint devices 100 may be included at each of motion owner variable space.

And, each of motion owner variables may represent one agent having authority on a joint device 100 among a pre-set plurality of agents 400. Accordingly, the device control module 200 may judge at which agent 400 the control right for the corresponding joint device 100 is dependent.

And, the control right on each of the joint devices 100 may be transferred to another agent 400 or device control module 200 according to change of the motion owner variable.

For the above, the device control module 200 may firstly identify an agent 400 having control right of a specific joint device 100 from the motion owner variable. And, the device control module 200 may collect the reference data of the identified agent 400 and may couple the collected reference data to generate the whole reference data for the whole joint devices 100 constructed integrally.

And, the device control module 200 may generate control signals for each of devices 100 using the whole reference data to transfer it properly.

And after reviewing whether existing, the value of corresponding joint reference may be read, and by doing so, the references of the joint of the whole robot constructed as only one set integrally are constructed, which may be transferred to the robot device and may be driven.

Through the data exchange method as described above, each joints of the robot can be controlled without collision at different agents 400. For example, when the lower body joints are controlled through an algorithm for posture stabilization of low body at one agent 400, while a specific task motion of upper body is generated at another agent 400, an entire body task of robot may be performed by integrating the results of two agents 400. This may enable an efficient control suitable for property of multi-agent system of the robot.

Figure 6:
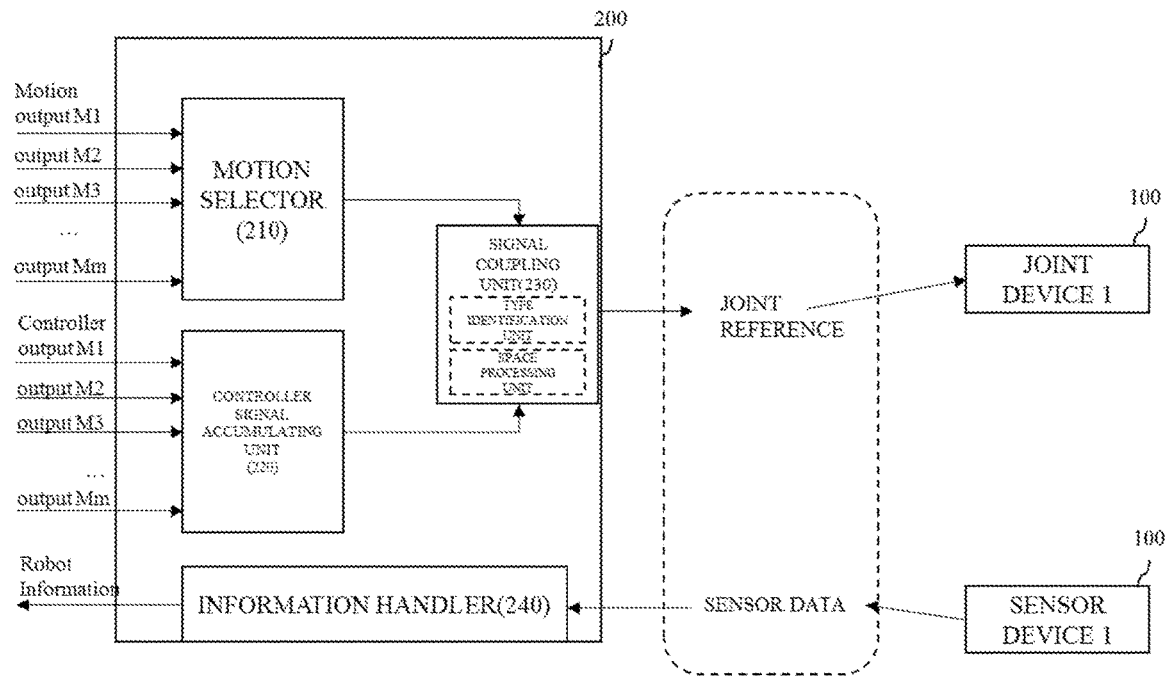
FIG. 6 is a block diagram for explaining the device control module according to an embodiment of the present invention.

FIG. 6 is a block diagram for explaining a device control module according to an embodiment of the present invention.

Referring to FIG. 6, the device control module 200 may include a motion selector 210, a controller signal accumulating unit 220, a signal coupling unit 230, and an information handler 240.

According to an embodiment of the present invention, the reference data for the joint may include two or more reference signals for joint motion control and detailed control. Accordingly, the agent 400 corresponding to each of joint devices 100 may generate two or more reference signals as reference data to store into the shared memory 300.

And, as shown in FIG. 6, the reference signals may be called as motion reference and controller reference. The motion reference may include reference data providing dominant value to each of joints, while the controller reference may include detailed reference data microscopically increased or decreased to the motion reference. However, the references in embodiments of the present invention is not limited to the designation thereof.

Accordingly, motion reference output data (M1~Mm) and controller reference (M1~Mm) may be inputted from the shared memory 300 to the device control module 200.

And, the motion reference may be selected as one per one joint device 100, but the controller reference may be accumulated all with addition and subtraction.

For the above, the motion selector 210 may select motion reference data corresponding to each of joint devices 100 from the motion reference data based on the motion owner variable information and may output the same to the signal coupling unit 230. Therefore, one motion reference data may be selected at one joint device 100.

And, the controller signal accumulating unit 220 may accumulate each of controller reference data regardless of the motion owner variable to output the result value to signal coupling unit 230.

And, the signal coupling unit 230 may synthesize the accumulated result value of the motion reference data and the controller reference data, may generate the final reference data by joint device 100, and may output it to a proper target joint device 100.

Here, the signal coupling unit 230 may identify the type of the reference and may distinguish process spaces according to the reference types. For the above, the signal coupling unit 230 may include type identification unit and space processing unit.

For example, the reference data may have not only joint operation but also other type such as task process, and accordingly, the type identification unit may identify the task type or whether joint type, and the space processing unit may provide process of other data space each other according to the type.

As described above, by separating the motion reference and the controller reference, a functional separation can be enabled at process generating the robot motion. For example, when generating motion of biped walking, one agent 400 may generate a basic walking pattern to generate motion reference, another agent 400 may design a damping controller, and further another agent 400 may design a controller reducing vibration, and by outputting as controller reference, very easy design and development may be enabled.

On the other hand, the information handler 240 may integrate sensor data collected from sensor device 100 or other measurement target devices and may perform function of outputting to the shared memory 300.

Figure 7:
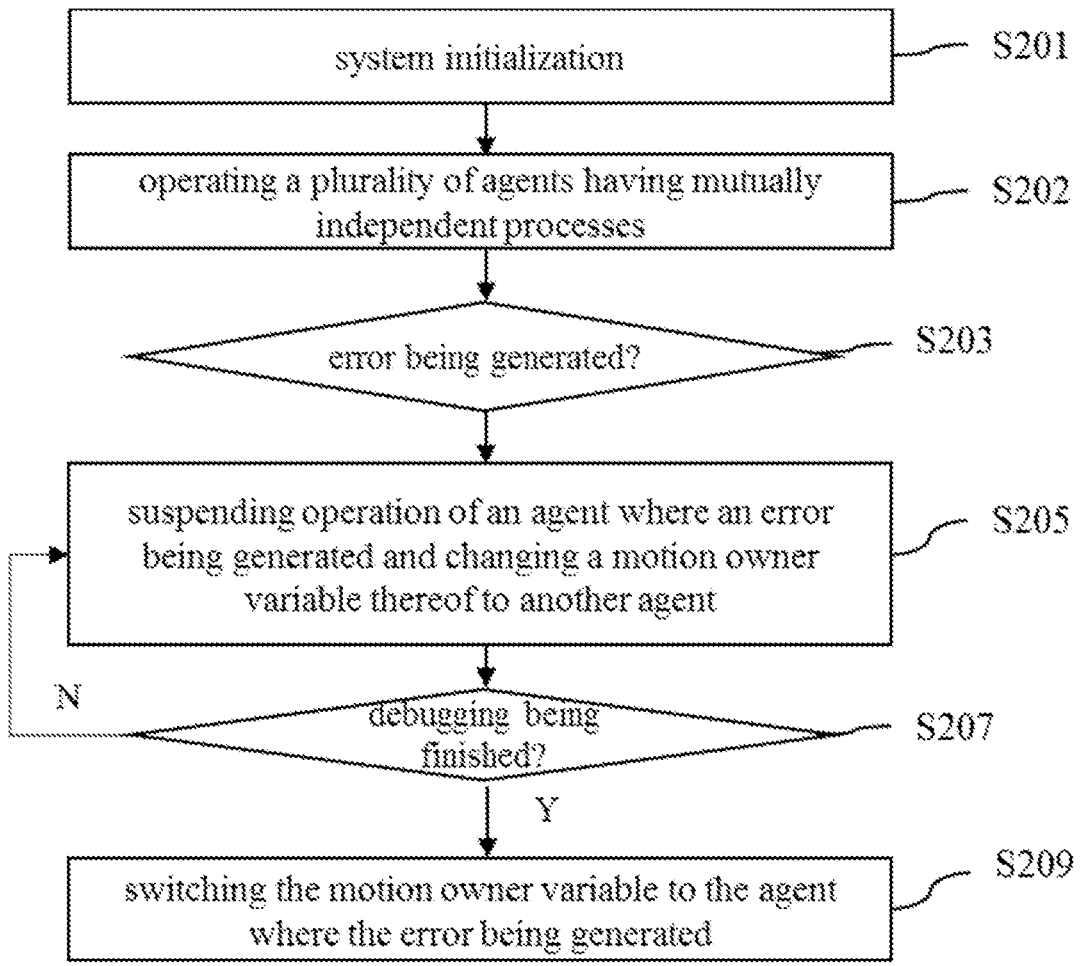
FIG. 7 is a flow chart for explaining control operation of the robot system according to another embodiment of the present invention.

FIG. 7 is a flow chart for explaining control operation of the robot system according to another embodiment of the present invention.

In general, when a problem occurs in an actual experiment using a robot, the robot should be driven from the first again. The robot initialization process may be simple in case of mobile platform, while, in case of multi-joint system as in humanoid, or in case that initialization on the ground is difficult to be performed and initialization needs to be performed in midair using crane or the like, the whole initialization process may be very cumbersome and may require a plenty of time.

Accordingly, as shown in FIG. 7, the device control module 200 according to an embodiment of the present invention can debug and test the robot again without process of such initialization of the robot.

For the above, firstly the system initialization may be performed (S201), and each of a plurality of agents 400 having mutual independent processes may be operated (S202).

After then, in case that a specific agent exists where an error is generated (S203), the operation of the agent where the error is generated may be suspended and the device control module 200 or other agent 400 may change the motion owner variable to another agent (S205).

Accordingly, when a problem occurs while a user tests motion algorithm through the agents 400, the motion owner may only be turned over to another agent 400 or device control module 200 and the code for the suspended agent 400 can be corrected.

And, in case that the prepared code is compiled, and the debugging is finished (S207), the motion owner variable may be switched to the original agent 400 again (S209).

As described above, a developer may continue experiment after bringing the motion owner. This may accelerate development as a result, and the user may, with further utilizing the above, may enjoy an effect that robot may be experimented in safety by observing the joint reference of the robot continuously at other specific AL to detect the occurrence of collision, and in case of generation of collision, by switching the motion owner.

Figure 8:
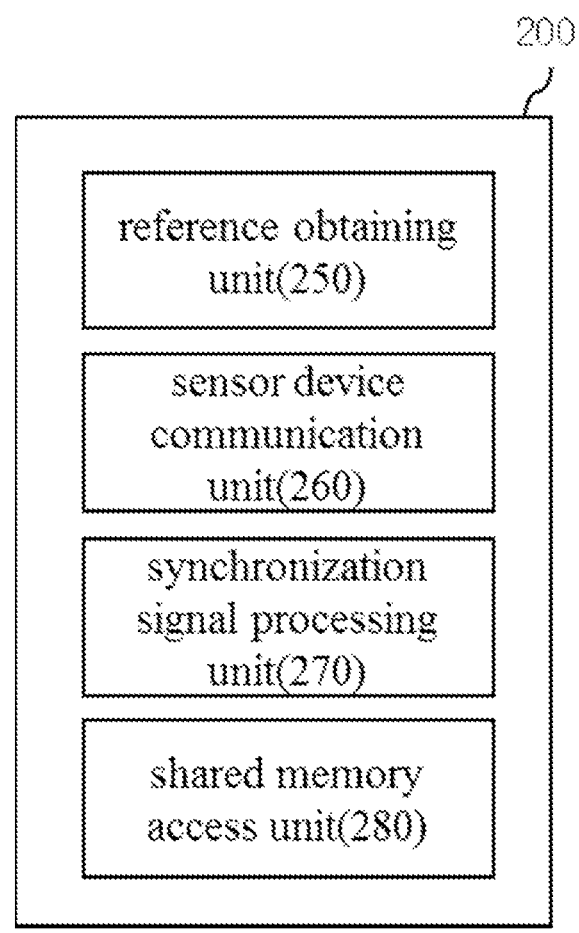
FIG. 8 is a drawing showing construction of the device control module according to an embodiment of the present invention.

FIG. 8 is a drawing of construction of the device control module 200 according to an embodiment of the present invention.

To realize a strict hard real-time framework in an actual real-time control environment, a real-time thread synchronization on processes of each of agents 400 may be achieved.

However, in case that the synchronization does not occur properly between several processes during a time restricted by each of steps (or periods), an unexpected jitter and jerk motion may occur due to one step fast update of joint reference or one step late update of joint reference. As these problems occur frequently, quality of motion may drop or the whole task of the robot system may become at a risk.

For example, in case that the device control module 200 and all the agents 400 are synchronized by a thread of real-time process having the same period as that of a control step, there may be a possibility of generation of partial error in actual values of outputted action, which may cause a problem of fail to maintain a strong real-time features.

More specifically, real-time threads included in each of processes have to receive influence of jitter according to operation time of each of processes, according to which a case that time axis between each of processes may occur. Due to the above, though the device control module 200 may synchronize the most recent reference and sensor values, references which is not updated may be reflected, by which quality of motion generation may be dropped by an inexact sensor data. As described above, by failure of update on offset time range according to always constant step period or by too fast update, a lot of problems may be caused.

Therefore, the device control module 200 according to an embodiment of the present invention can settle such a problem as above by performing data obtaining using the shared memory 300, one step delay and synchronization process between the agents 400 for thread synchronization between processes.

For the above, the device control module 200 may perform a step-based control, may obtain status information of current step from the control target devices 100 to transfer to one or more operation agents 400, may obtain reference information pre-operated based on status information of previous step at previous step with respect to current step from the operation agent, and may transmit the reference information to the devices 100 as control signals corresponding to current step. And the reference motion operated at previous step may be realized at a device of current step, while the sensor information of current step may be transferred to each of operation agents 400 and may be processed, by which realization of operation without time delay and jitter in reference within one step period may be enabled.

Accordingly, referring to FIG. 8, the device control module 200 according to an embodiment of the present invention may include a reference obtaining unit 250, a sensor device communication unit 260, a synchronization signal processing unit 270 and a shared memory access unit 280.

Here, each of construction elements of the device control module 200 may finish all the control and operation processes in a control period corresponding to one step and may perform the same processes again in next step.

And, the construction elements of the device control module 200 may be realized as a hardware processor or a software module process which may be processed using the whole or a unit of functions of above-mentioned motion selector 210, controller signal accumulating unit 220, signal coupling unit 230, and information handler 240.

First, the sensor device communication unit 260 may be solely connected to each of devices 100 and may transmit and receive control signals and sensor data to and from the device control module 200. Here, the sensor data may be a concept including the status information of each of devices 100, while the status information may include all of not only information sensed at separate sensor module but also operation environment information of the devices 100 or the like.

And, the sensor device communication unit 260 may receive sensor values updated at current step from each of devices 100 and may update the sensor values into the sensor data of the shared memory 300 through the shared memory access unit 280.

And, each of the agents 400 may access to the shared memory 300 according to synchronization signal processed at the synchronization signal processing unit 270 and may obtain updated sensor values of current step. In an embodiment, the sensor value of current step may be used in operation process for references of next step.

And, reference obtaining unit 250 may obtain reference data pre-operated based on status information (sensor data etc.) of previous step by each of the agents 400 at previous step with respect to current step from the shared memory 300 as references of current step.

And, the sensor device communication unit 260 may also generate control signals of current step using the obtained reference data according to synchronization signal received from each of agents 400 by the synchronization signal processing unit 270 and may transfer the generated control signals to each of devices 100.

Accordingly, the device control module 200 may convert references updated at the shared memory 300 according to status information of previous step to control signals of current step and may process the motion control of the devices 100. According to above, each of agents 400 can operate separately according to control time given enough, while motion control signals for devices 100 can be outputted directly with synchronization to current step without separate complex operation, by which motion time axis error, jitter, error or the like may be settled to improve quality of motion according to stable operation.

Figure 9:
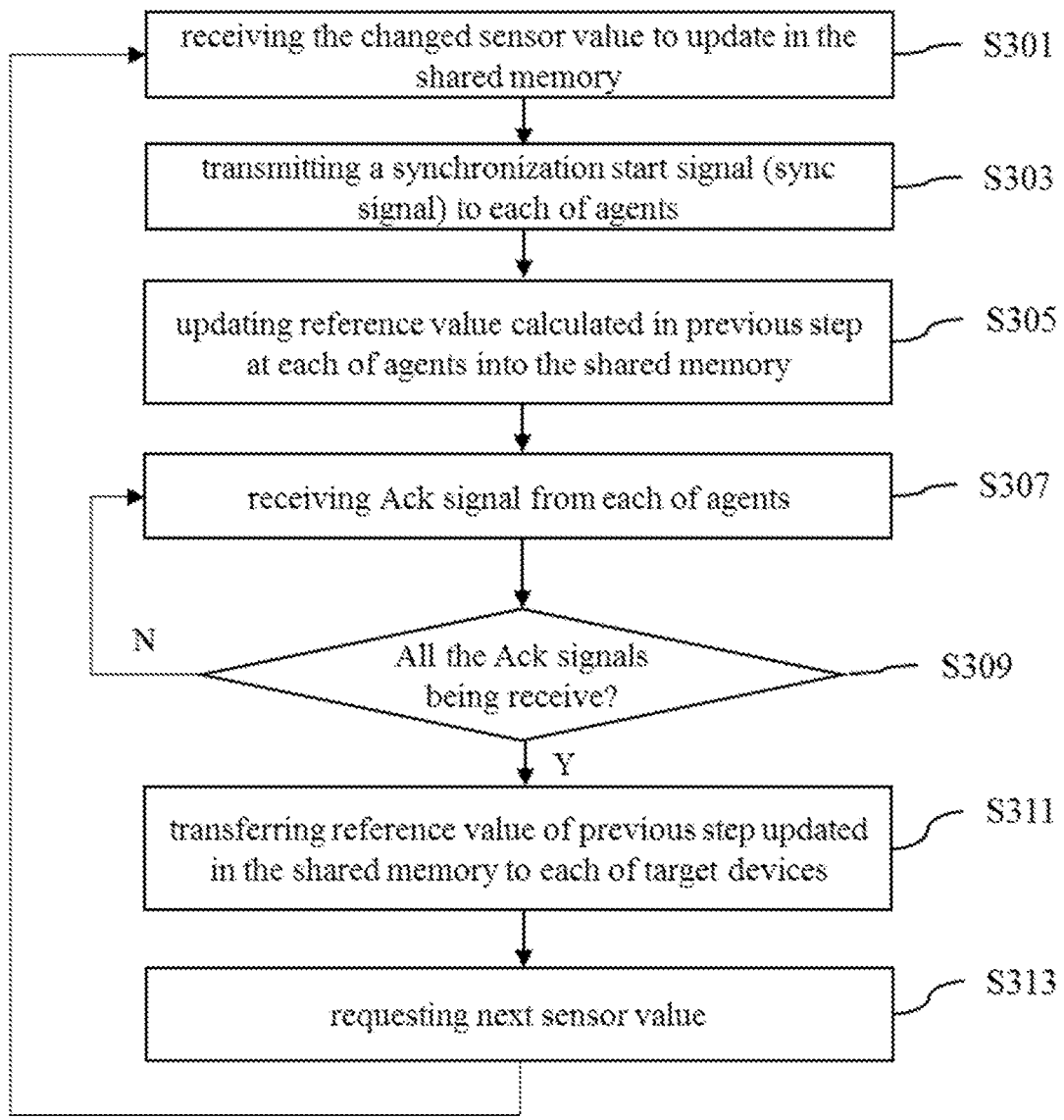
FIG. 9 is a flow chart for explaining operation of the device control module and the agents according to an embodiment of the present invention.

FIG. 9 is a flow chart for explaining operation of the device control module 200 and the agents 400 according to an embodiment of the present invention.

Referring to FIG. 9, first, the device control module 200 may receive changed sensor values from each of devices 100 through the sensor device communication unit 260 and may perform update of the shared memory 300 (S301).

When finishing update, the device control module 200 may transmit synchronization start signal (SYNC SIGNAL) to each of agents 400 through the synchronization signal processing unit 270 (S303).

When the synchronization start signal is received, each of agents 400 may obtain sensor data of current step from the shared memory 300 and may operate references of next step based on the obtained sensor data.

On the other hand, according to the synchronization start signal, each of agents 400 may update the reference values calculated at previous step onto the shared memory 300 (S305).

Here, the references of the previous step may include values generated from sensor data of previous step and calculated in advance. Accordingly, only the result values may be updated at current step, by which the output time may be minimized.

When update is finished, the device control module 200 may receive a reply signal (Ack signal) from each of agents 400 through the synchronization signal processing unit 270 (S307).

Accordingly, the synchronization signal processing unit 270 of the device control module 200 may judge whether reply signals are received from all the agents 400 (S309), and in case that all is received, the reference obtaining unit 250 of the device control module 200 may obtain the reference values of previous step updated on the shared memory 300 through the shared memory access unit 280, and may transfer the control signals according to the reference values of previous step to each of devices 100 (S311).

And, the device control module 200 may request next sensor value through the sensor device communication unit 260 (S313).

Here, steps of S301 to S311 may be all realized within one step corresponding to operation period time of the robot system. And, the one step may be synchronized to operation period of the device control module 200. Since the current sensor data-based operation process of each of agents 400 may be used in obtaining references of next step, the processing time thereof can be minimized with respect to current step and the synchronization can be maintained without error, by which the system according to an embodiment of the present invention can provide very strong strict hard real-time features. A Pseudo Code on synchronization operation of the device control module 200 may be disclosed in FIG. 15.

Figure 15:
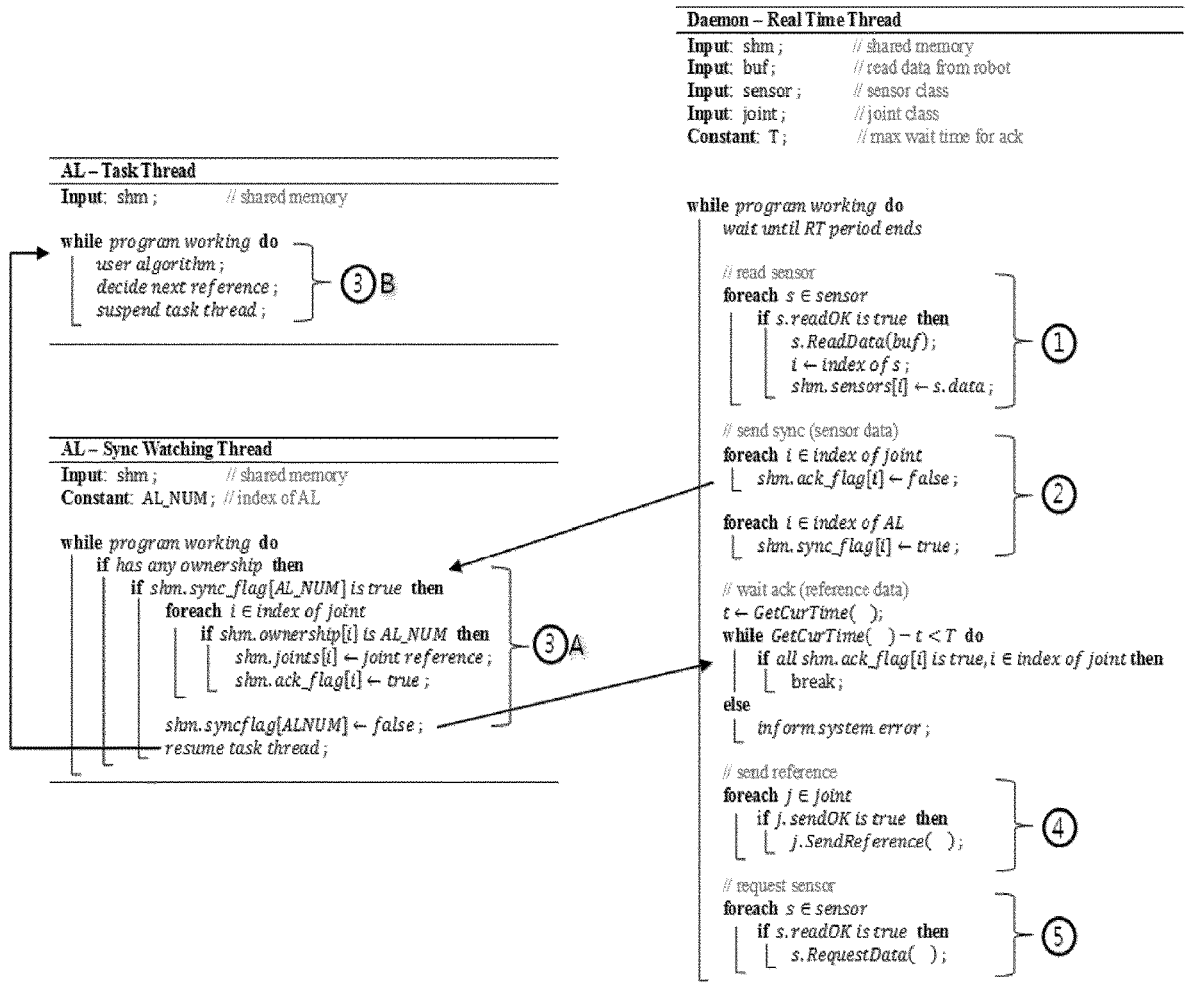
FIG. 15 is a table showing a pseudo code of one step period for generating real-time motion of the joint device.

FIG. 15 shows a pseudo code of one step period for generating real-time motion of the joint device 100, wherein the device control module 200 may deliver sensor data (s.data) received from the sensor and may obtain joint references operated from sensor data of previous step, to transfer to each of joint devices (joint). In FIG. 15, the device control module 200 may be expressed as a Deamon as a meaning of controlling overall each of devices 100, and each of the agents 400 may be expressed as AL for having a connection structure as each of grapes in a bunch. The algorithm of each of the agents 400 may be realized by users and developers.

As shown in FIG. 15, the device control module (Deamon) 200 may operate a real-time thread, and in current step, i) when sensor data is obtained, ii) synchronization (SYNC) signal may be transferred to each of agents 400 together with the sensor data, iii-A) each of agents (AL) 400 may update references operated at previous step into the shared memory 300 and may transmit reply (ACK) signal, iii-B) each of agents (AL) 400 may operate references of next step corresponding to sensor data of current step, and iv) the device control module (Deamon) 200 may transfer the updated references to the joint devices 100. And, v) sensor data of next step may be requested to each of devices 100.

For example, as shown in FIG. 15, each of the agents 400 may perform Task Thread according to algorithm of oneself own and may process operation for next reference based on sensor data of current step. And when the process is finished, it may wait till next step. Here, in case that next step is supposed to be current step, the operation for the references may be an operation processed in advance at previous step.

And, when a synchronization start signal (sync_flag) is received through a synchronization watching thread (Sync Watching Thread), the agents 400 may update reference (joint reference) of previous step pre-operated and generated according to owner information of each into the shared memory and may transfer a ack signal (ack_flag) according to update result to the device control module 200.

According to the synchronization process as described above, the device control module 200 may use One Step Delay to synchronize the control signals according to the joint references to the thread between sensor data and processes. Through the above, a strong and uniform device control can be enabled and a strict hard real-time can be realized as a result. And, each of agents 400 can fully utilize time of given control step period.

Figure 10:
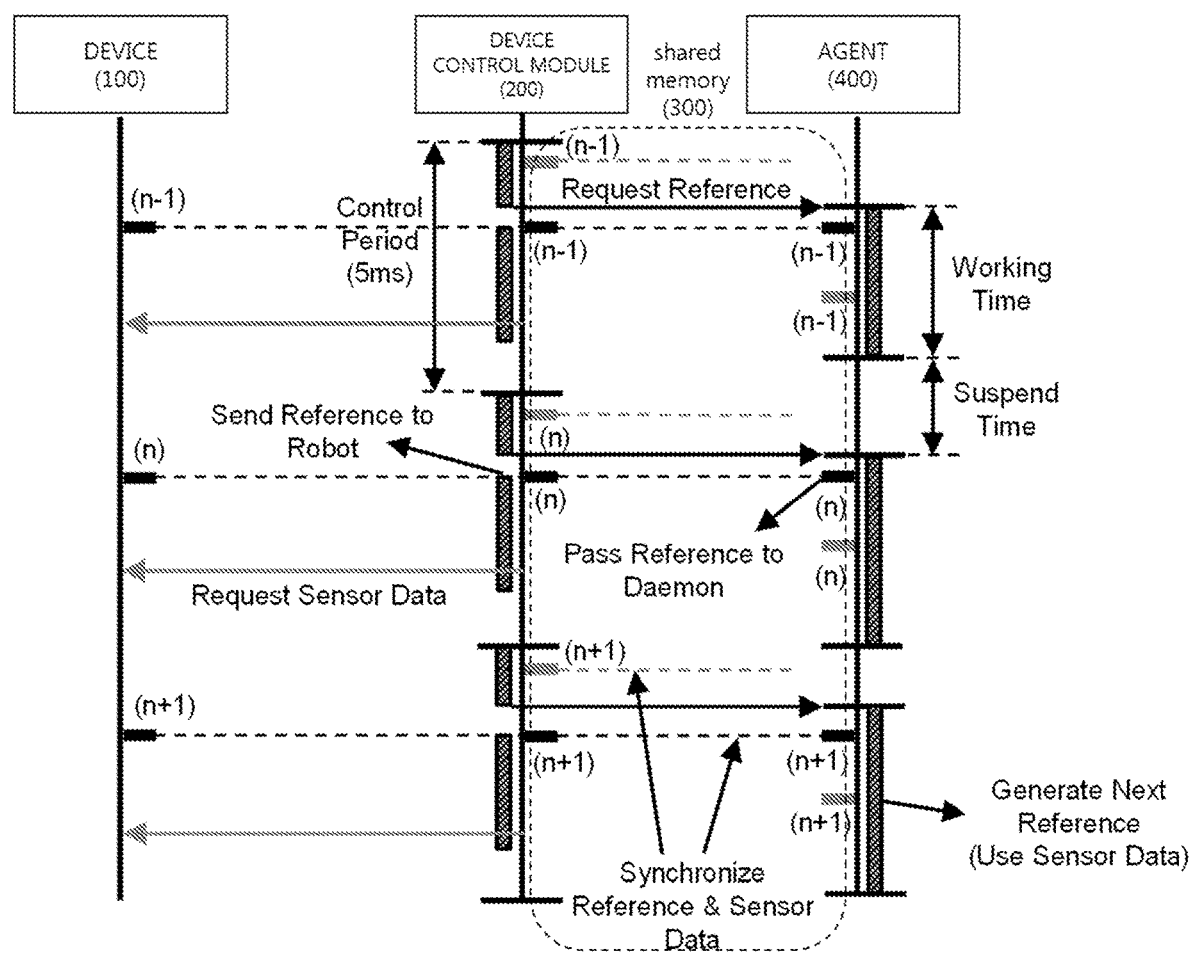
FIG. 10 is a timing chart for showing operation timing among the devices, the device control module and the agents according to an embodiment of the present invention.

FIG. 10 is a timing chart for showing operation timing among the device 100, device control module 200 and the agents 400 according to an embodiment of the present invention.

As shown in FIG. 10, first, the device control module 200 may obtain sensor data for 5 ms of control step period (Control Period) thereof and may obtain reference value which the agents 400 operated at previous step to transfer to the devices 100. And, data share between the device control module 200 and the agents 400 may be realized through input and output with respect to the shared memory 300.

As shown in FIG. 10, sensor data at previous step (n−1) may be processed at the agents 400, and the processed time (Working Time) may be shorter than control step period. Accordingly, in each of agents 400, there may exist waiting time (Suspend Time). And, when control period of current step starts, each of agents 400 may transfer references operated at previous step (n−1) to the device control module 200 according to synchronization signal received from the device control module 200, and the device control module 200 may transfer sensor data of current step (n) to the agents 400. Each of agents 400 may process operation based on sensor data of current step (n) and may generate reference data for next step (n+1).

And, each of device control module 200 and the agents 400 may be realized as thread, while only the device control module 200 may include thread having 5 ms of the same period as control step period. This is because the role performed by the device control module 200 is predetermined and having thread of the highest priority order, by which time spent to do given action may be almost constant. Therefore, 5 ms of given control period may be a very long time in view of the device control module 200, and a strict hard real-time may be realized using these properties.

Accordingly, operation of the device control module 200 may perform only functions minimizing change of time offset value from start point of thread of all the actions. Accordingly, when only the effectiveness of values due to each of actions is guaranteed, the quality of strict hard real-time control of a variety of systems can be improved.

On the other hand, FIG. 11 to FIG. 14 are drawings of time element and test result for performance verification of control system according to an embodiment of the present invention.

Figure 11:
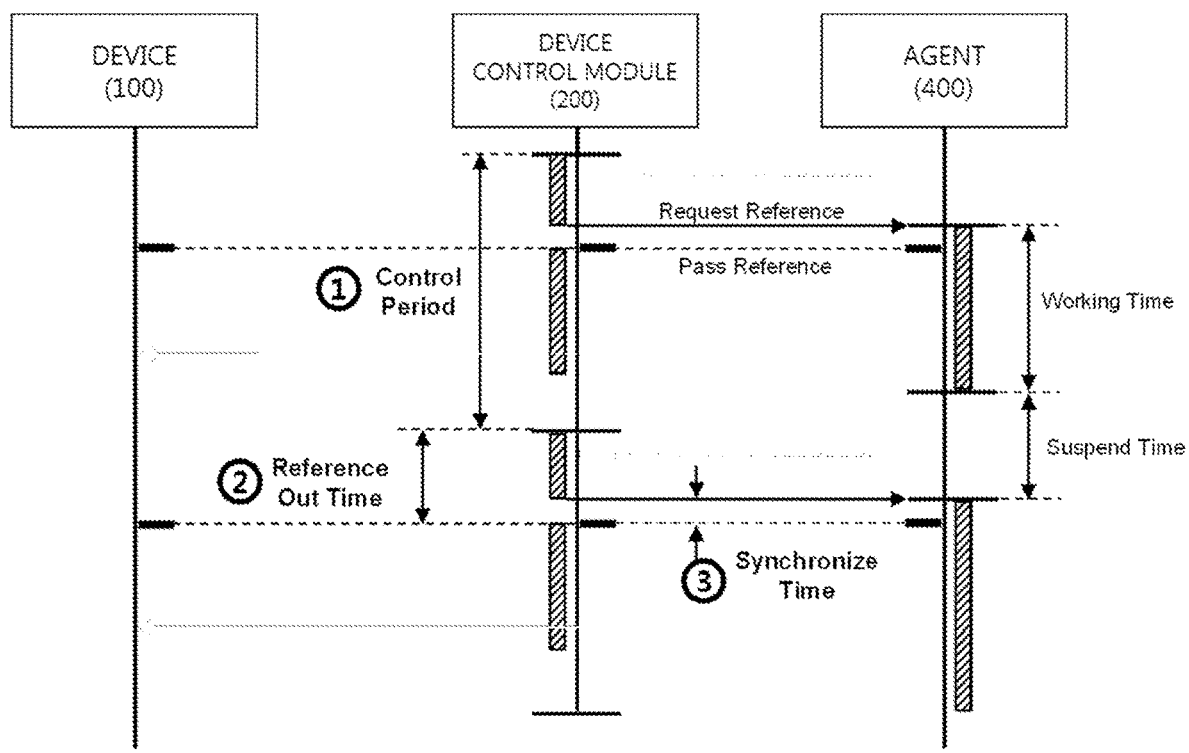
FIG. 11 to FIG. 14 are drawings depicting time element and test result for performance verification of the control system according to an embodiment of the present invention.

FIG. 11 shows three elements of time measured for performance test of the system according to an embodiment of the present invention.

First of all, 1) the period of real-time thread of the device control module 200 was measured, through which whether real-time thread guarantees repeated uniform period may be verified. Next, 2) the offset from start of thread of time when the joint references are transferred to the devices 100 was measured. Through the above, whether strict hard real-time having almost no delay of action is realized may be verified. Lastly, 3) the time spent in thread synchronization from sending Sync. Signal to receiving Ack. Signal between the device control module 200 and the agents 400 was measured. This shows a system reactivity, and an influence on the extent of delay of action of which the value is the second measurement value may be grasped. This test was performed for cases that the numbers of the agents 400 of operating test are 1, 3, 5, and 10, and 4,000 samples each from each of experiments were obtained.

Figure 12:
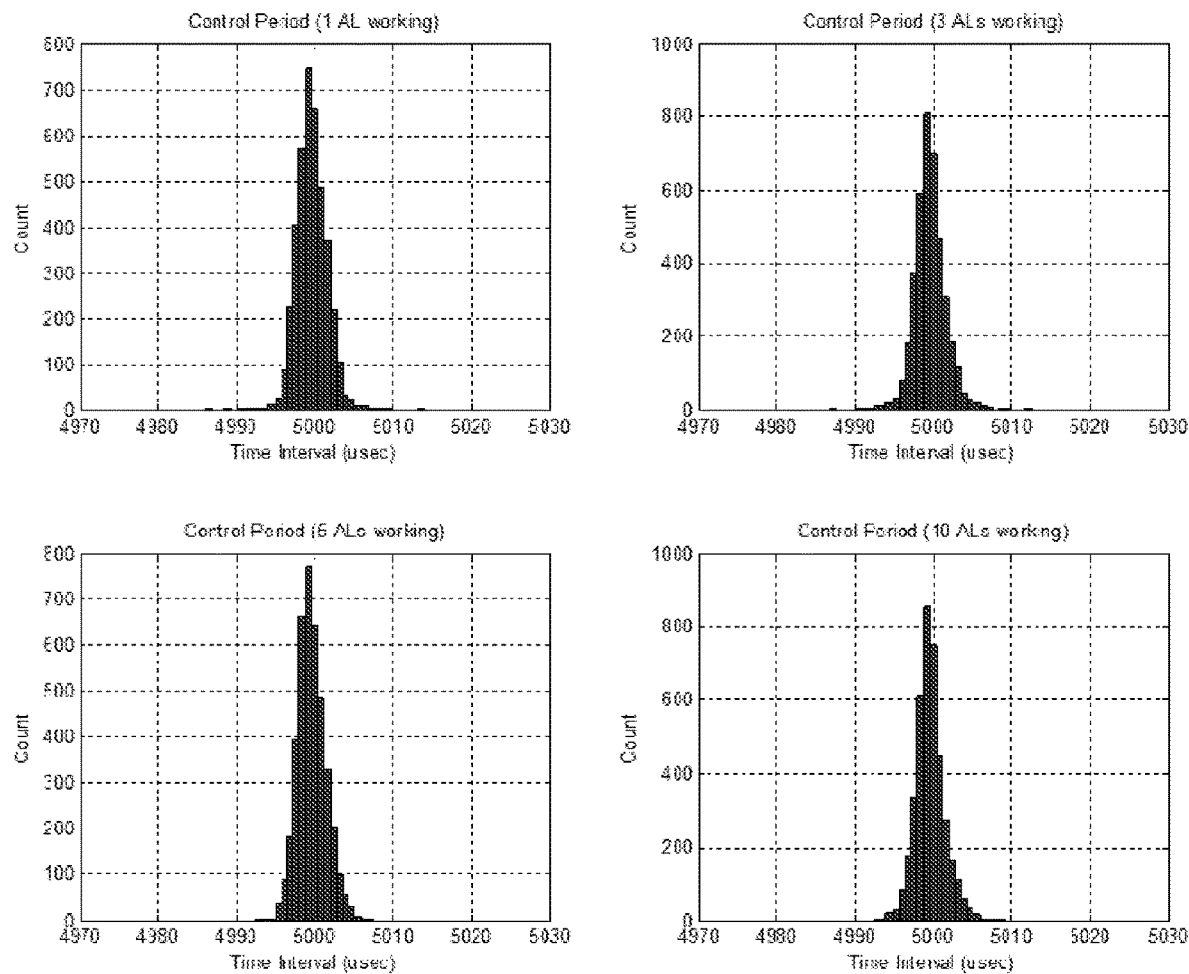

FIG. 12 shows a Histogram graph of case 1).

Referring to FIG. 12, concentration on 5,000 μS can be verified regardless of number (count) of operating agents (AL) 400. And excellent performance is shown with maximum jitter of 10 μs. That is, it can be verified that the real-time thread of the device control module 200 may start and finish given work exactly at period which the user desires.

Figure 13:
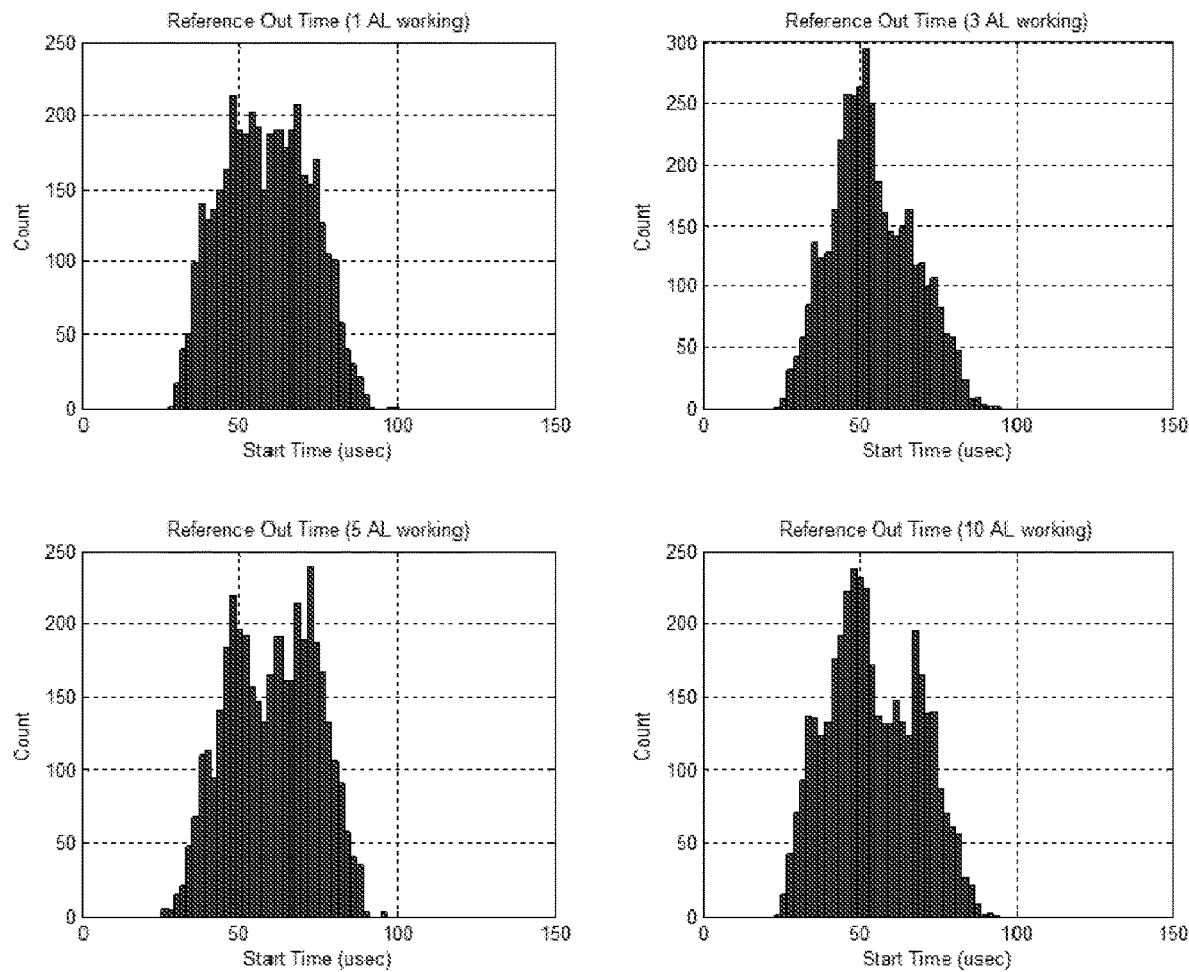

FIG. 13 shows a Histogram of time spent in outputting the joint reference in case 2).

Referring to FIG. 13, it is shown that reference values are transferred as control signals between 30 to 100 μs after start of real-time thread of the device control module 200. And, it can be verified that no tendency according to the number of operating agents (AL) 400 is shown. The amount of change is about 70 μs, which is time about 1.5% of control period, and about 7 times of measured jitter, wherein the period was 1 ms (1,000 μs) since the motor controller of the experiment is operated at 1 kHz. Therefore, this means that the variation of time spent in outputting references is smaller than 10% of motor control period of the devices 100, this means that the system construction of the present invention may guarantee enough performance even in driving a Multi-Rate System with different operation frequency between the device and the control system.

Figure 14:
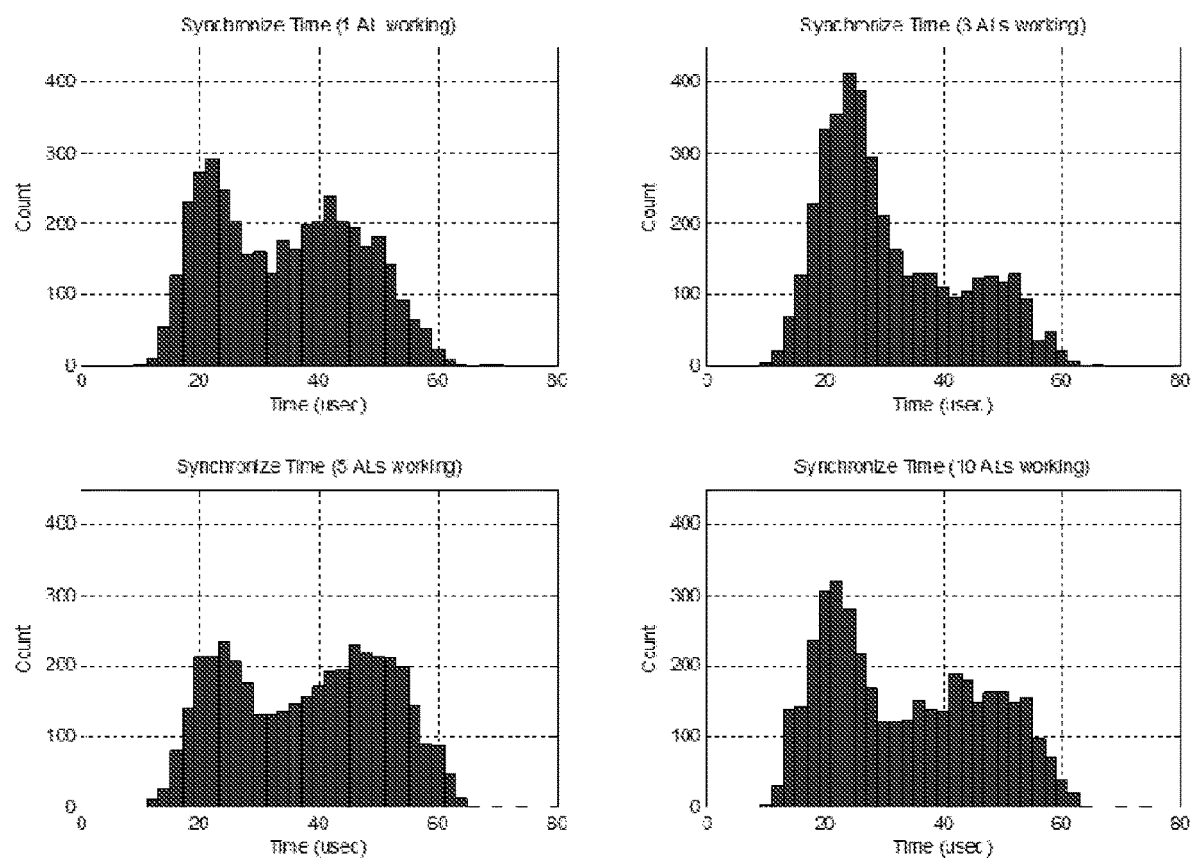

On the other hand, FIG. 14 shows a Histogram of time spent in occurrence of synchronization between threads of the device control module 200 and the agents (AL) 400.

It can be verified that the time may variable from minimum of 10 μs to maximum of 70 μs. Comparing to the result of prior experiment, among the times for the device control module 200 to output references, the time spent in synchronization of case 3) is the longest. This phenomenon is because the thread of the device control module 200 has the highest priority order. Therefore, the faster the thread of the agents (AL) 400 grasping Sync. Signal runs, the more CPU resources of PC may be consumed. And since CPU resources to be invested in operation for performance of synchronization and generation of motion are conflicting with each other, a trade-off at a proper line may be possible. Accordingly, it can be verified that as much resources of CPU as possible can be allocated to the user while guaranteeing enough performance for operating system.

As described above, according to embodiments of the present invention, a plurality of agents having mutually independent processes and a shared memory where references generated according to operation of the plurality of agents are stored are provided, and a separate device control module controlling the hardware device using the references is provided. Therefore, in a robot system needing real-time features, several independent processes for the same hardware control may coexist while operation of robot may be controlled with stability. And, even though each of agents are developed independently, the synthesis and selection of references is enabled through the shared memory, by which the possibility of mutual collision may be dropped, and strong real-time features may be secured. And, since agent substitution, real-time debugging and the like at the time of error occurrence becomes easy, co-work convenience and expandability can be enjoyed.

And, according to embodiments of the present invention, in the thread synchronization between processes, One Step Delay processing method using the shared memory is provided to minimize process delay between the device control module and agents and devices and to optimize real-time synchronization process, by which a control system reinforcing output signal quality and real-time features and minimizing error and Jitter with more elaboration may be provided.

On the other hand, the methods according to the present invention described above may be produced as a program for execution on a computer and stored in a recording medium readable by a computer, wherein examples of recording medium readable by the computer may include ROM, RAM, CD-ROM, magnetic tape, floppy disk, light data storage apparatus and the like, to which something realized in a form of carrier wave (for example, transmission through internet) may be included.

The recording medium readable by the computer may be distributed in a computer system connected by network and the code readable by the computer may be stored and executed in a distributive way. And, the functional (function) program, code and code segments to realize the method may be inferred by programmers of the technical field where the present invention pertains with ease.

And, even though some desirable embodiments of the present invention have been described above, the present invention may not be limited to the above-mentioned specific embodiments, but also of course a variety of modified realization may be possible by a person having an ordinary knowledge in the technical field where the present invention pertains without escaping from the gist of the present invention written in claim, and these modified implements should not be appreciated as separate from the technical idea or perspective of the present invention.

What is claimed is:

1. A system controlling method of a computer-based real-time device controlling system, the system controlling method comprising:
   operating a plurality of agents having mutually independent processes using a shared memory connected to a device control module of the real-time device controlling system, wherein the plurality of agents are software modules on an operating system connected to the real-time device controlling system;
   obtaining, by the device control module, hardware control data for controlling one or more control target devices from each of references generated from the plurality of agents and stored in the shared memory; and
   transferring control signals according to the references to the one or more control target devices selected from the hardware control data,
   wherein the device control module is a module configured for generating a real-time thread having a control period synchronized to the plurality of agents on the operating system connected to the real-time device controlling system.

2. The system controlling method according to claim 1, further comprising:
   receiving sensor data from the one or more control target devices;
   updating the shared memory using the received sensor data; and
   outputting the references updated according to the sensor data into the shared memory by the plurality of agents.

3. The system controlling method according to claim 1, wherein the shared memory comprises a motion owner variable corresponding to a joint device, the motion owner variable showing one agent having authority to the joint device among the plurality of agents, and
   wherein the system controlling method further comprises:
   suspending operation of an agent where an error is generated in case that the agent where the error is generated exists among the plurality of agents; and
   changing the motion owner variable corresponding to the agent where the error is generated to another agent.

4. The system controlling method according to claim 1, wherein the obtaining the hardware control data comprises:
   generating hardware abstraction data according to each of the references;
   generating the control signals corresponding to the hardware abstraction data using a hardware database comprising hardware information on the one or more control target devices; and
   transferring the control signals to the one or more control target devices.

5. The system controlling method according to claim 1, wherein all the steps of operating, obtaining, transferring, receiving and updating are processed in a first period corresponding to a real-time operation period of the system.

6. A controlling apparatus of a computer-based real-time device controlling system, the controlling apparatus comprising:
   a plurality of agents having mutually independent processes operated using a shared memory, wherein the plurality of agents are software modules on an operating system connected to the real-time device controlling system;
   the shared memory connected to a device control module of the real-time device controlling system, in which references generated according to operation of the plurality of agents are stored; and
   the device control module configured for obtaining hardware control data for controlling one or more control target devices from each of the references generated from the plurality of agents and stored in the shared memory and transferring control signals according to the references to the one or more control target devices selected from the hardware control data,
   wherein the device control module is a module configured for generating a real-time thread having a control period synchronized to the plurality of agents on the operating system connected to the real-time device controlling system.

7. The system controlling apparatus according to claim 6, wherein the device control module is further configured for:
   receiving sensor data from the one or more control target devices;
   updating the shared memory using the received sensor data; and
   controlling the plurality of agents to output the references updated according to the sensor data to the shared memory.

8. The system controlling apparatus according to claim 6, wherein the shared memory includes a motion owner variable corresponding to a joint device, the motion owner variable showing one agent having authority to the joint device among the plurality of agents, and
   wherein the system controlling apparatus further comprises a user system for suspending operation of an agent where an error is generated and changing the motion owner variable corresponding to the agent where the error is generated to another agent in case that the agent where the error is generated exists among the plurality of agents.

9. The system controlling apparatus according to claim 6, further comprising a hardware database comprising hardware information on the one or more control target devices,
   wherein the device control module is configured for generating hardware abstraction data according to each of the references, generating the control signals corresponding to the hardware abstraction data using the hardware database comprising hardware information on the one or more control target devices, and transferring the control signals to the one or more control target devices, and
   wherein the hardware information comprises at least one of the control target devices, reduction gear ratio, encoding pulse, number of driver channels, and communication protocol information.

10. The system controlling apparatus according to claim 6, wherein the one or more control target devices comprises a joint device or a sensor device of the real-time device controlling system,
    wherein the device control module is further configured for obtaining status information of current step from the control target devices; transferring the status information to the plurality of agents processing reference operations using the status information of current step; obtaining reference information pre-operated based on status information of previous step from the agents; and transferring the reference information to the device as a control signal corresponding to current step, and
    wherein the real-time device controlling system further comprises:
    a user system for managing real-time operation period and execution operation of the device control module and the plurality of agents.

* * * * *